and second edges of the bearing pad. For one direction of rotation of the journal, the first edge will be the "leading" edge, while the second edge will be the "trailing" edge. For the opposite direction of rotation, the converse will be true. The bearing pad includes a pivotal support permanently located midway between the first and second edges. A low pressure oil supply is connected through lines of substantially equal frictional loss to each of the opposite oil distribution grooves. For any given direction of rotation of the journal, each pivoted bearing pad will automatically tilt in such manner as to provide a larger spacing at the leading edge of the pivoted bearing pad for the particular direction of rotation, to thereby insure proper development of the oil wedge between the rotating journal and the pivoted bearing pad. The frictional loss at the incoming oil channel at the leading edge of the bearing is less due to the wider spacing at the leading edge, and most of the oil flow will automatically be directed to the incoming oil channel, eliminating the need for elaborate valving to control oil flow at the incoming oil channel for each pivoted bearing pad. A minimum of two pivoted bearing pads is required to support the rotating journal.

United States Patent [19]
Jenness

[11] 3,891,281
[45] June 24, 1975

[54] PIVOTED PAD BEARING APPARATUS AND METHOD FOR BIDIRECTIONAL ROTATION

[75] Inventor: Raymond C. Jenness, Milwaukee, Wis.

[73] Assignee: Allis-Chalmers Corporation, Milwaukee, Wis.

[22] Filed: Apr. 8, 1974

[21] Appl. No.: 459,119

[52] U.S. Cl.................. 308/1 R; 308/73; 308/116
[51] Int. Cl. ............................................ F16c 17/06
[58] Field of Search.............. 308/1 R, 2 R, 73, 116, 308/119, 122

[56] References Cited
UNITED STATES PATENTS

| | | | |
|---|---|---|---|
| 3,258,300 | 6/1966 | Saunders | 308/73 |
| 3,431,034 | 3/1969 | Saunders | 308/73 |
| 3,604,767 | 9/1971 | Decker | 308/73 |

Primary Examiner—M. Henson Wood, Jr.
Assistant Examiner—Michael Mar
Attorney, Agent, or Firm—Robert C. Sullivan

[57] ABSTRACT
A pivoted pad journal bearing for and method of supporting a journal member for bidirectional rotation. A separate oil distribution groove is provided in the journal bearing face of the pivoted bearing pad contiguous but spaced from each of the respective opposite circumferentially spaced first

10 Claims, 7 Drawing Figures

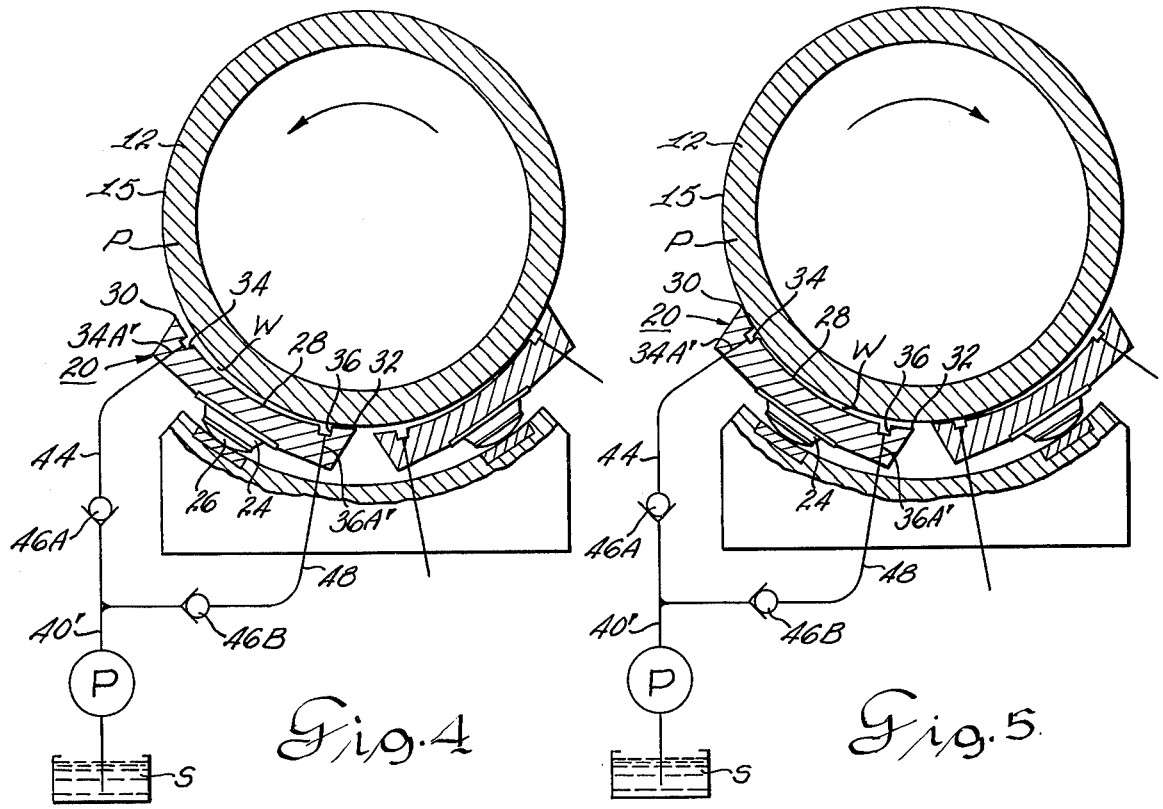
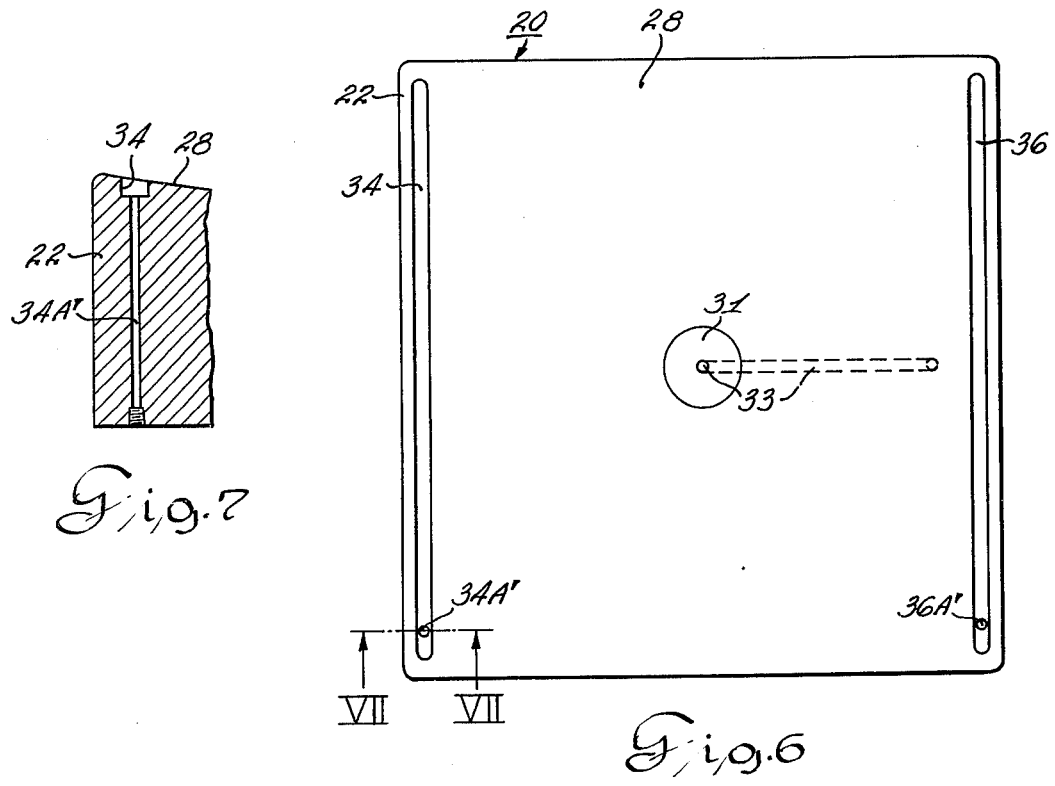

3,891,281

PIVOTED PAD BEARING APPARATUS AND METHOD FOR BIDIRECTIONAL ROTATION

BACKGROUND OF THE INVENTION

Field of the Invention

This invention relates to journal bearings, and more particularly to a journal bearing of the pivoted pad type which is adapted for bidirectional rotation of the journal which is supported for rotation, and to a bearing apparatus and method of lubricating such bearings in which the flow of lubricating oil to the interface between the bearing and the rotating journal automatically adjusts itself for the direction of rotation.

STATEMENT OF THE INVENTION

Accordingly, it is an object of the present invention to provide a pivoted pad journal bearing which permits bidirectional rotation of the journal member journalled for rotation in the pivoted pad bearing without the necessity of special valving to control the flow of lubricating oil for proper development of the oil wedge at the leading edge of each pivoted bearing pad for each direction of rotation.

It is another object of the invention to provide a pivoted pad bearing arrangement for and method of supporting a journal member for bidirectional rotation in which the oil is fed to the region of the leading and trailing edges of each pivoted bearing pad in such manner that the lubricating oil flow automatically adjusts itself to provide greater oil flow in the region of the leading edge for the particular direction of rotation, whereby to promote proper development of the oil wedge between the rotating journal and the pivoted bearing pad.

In achievement of these objectives, there is provided in accordance with an embodiment of the invention, a pivoted pad journal bearing for and method of supporting a journal member for bidirectional rotation in which a separate oil distribution groove is provided in the journal bearing face of the pivoted bearing pad contiguous but spaced from each of the opposite circumferentially spaced first and second edges of the bearing pad. For a given direction of rotation of the journal, the first edge will be the leading edge, while the second edge will be the trailing edge. For the opposite direction of rotation, the converse will be true. The bearing pad includes a pivotal support permanently located midway between the first and second edges. A low pressure oil supply is connected through lines of substantially equal frictional loss to each of the opposite oil distribution grooves. For any given direction of rotation of the journal, the pivoted bearing pad will automatically tilt in such manner as to provide a larger spacing at the leading edge of the pivoted bearing pad for the particular direction of rotation, to thereby insure proper development of the oil wedge between the rotating journal and the pivoted bearing pad. The frictional loss at the incoming oil channel at the leading edge of the bearing pad is less due to the wider spacing at the leading edge, and most of the oil flow will automatically be directed to the incoming oil channel, eliminating the need for elaborate valving to control oil flow at the incoming oil channel for each pivoted bearing pad.

Further objects and advantages of the invention will become apparent from the following description taken in conjunction with the accompanying drawings in which:

BRIEF DESCRIPTION OF THE DRAWINGS

FIG. 4 is a schematic view of a rotating journal supported by pivoted bearing pads, showing the lubricating system connections and the relative position of the pivoted bearing pads for an assumed counterclockwise direction of rotation of the rotating journal relative to the view of FIG. 4;

FIG. 5 is a view similar to FIG. 4 but showing the lubricating system connections and relative position of the pivoted bearing pads for an assumed clockwise direction of rotation relative to FIG. 5;

FIG. 6 is a top plan view of one of the bearing pads showing the location of the oil distribution grooves; and FIG. 7 is a view in section along line VI—VI of FIG. 6.

DESCRIPTION OF PREFERRED EMBODIMENT

Figure 1:
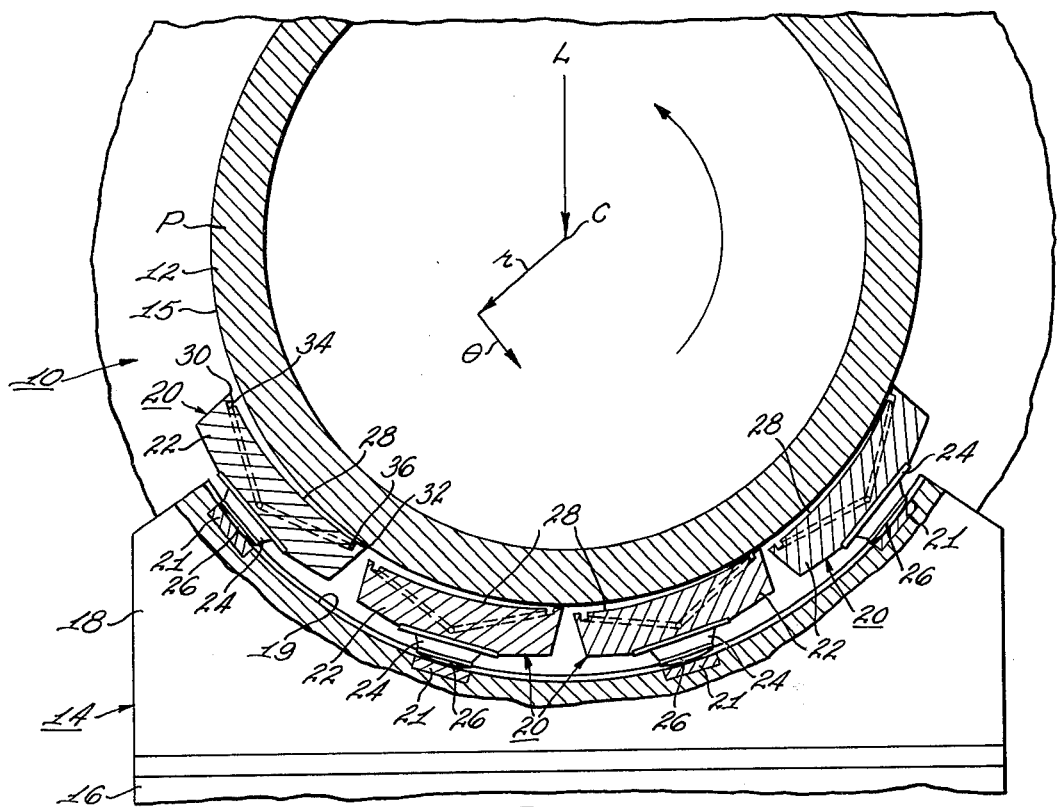
FIG. 1 is a view substantially along line I—I of FIG. 2 showing a grinding mill journalled for rotation in a bearing structure in accordance with the invention.
Figure 2:
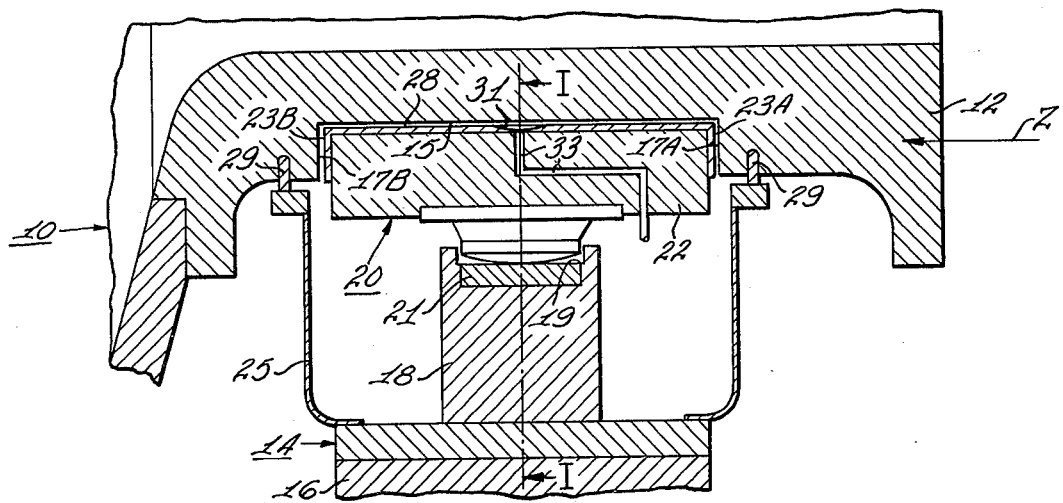
FIG. 2 is a view in axial section of the structure of FIG. 1.

Referring now to the drawings and more particularly to FIGS. 1 and 2, there is shown a rotary grinding mill generally indicated at 10 of the type used for grinding mineral ore or the like and having a hollow trunnion 12 which is mounted on a bearing structure generally indicated at 14. The trunnion 12 may be either the inlet trunnion or the discharge trunnion of the grinding mill. A bearing arrangement generally similar to that to be described herein is preferably provided at each of the opposite ends of the mill for supporting the respective inlet and discharge trunnions of the mill.

The bearing structure generally indicated at 14 comprises a normally vertical bearing pedestal 16 on the upper surface of which is suitably mounted an upwardly open bearing support 18. The upper surface 19 of bearing support 18 is an arcuate portion of a cylinder whose radius is drawn substantially from the longitudinal axis C of trunnion 12. At circumferentially spaced intervals, surface 19 of bearing support 18 is recessed to receive inserts 21 of a suitable supporting material such as high grade hard tool steel for supporting the respective bearing pads 20 to be described. It will be noted that bearing support 18 only extends beneath the lower portion of the periphery of trunnion 12, the arcuate extent of bearing support 18 in the illustrated embodiment being less than 180°, as is common practice in the supporting arrangements for rotating trunnions of grinding mills. A suitable housing 25 is mounted on the upper end of bearing pedestal 16 in enclosing relation to the upper portion of the bearing structure to prevent contamination and loss of bearing lubricant. The upper end of housing 25 supports suitable seals 29 which engage the periphery of the rotating trunnion 12.

The journal bearing comprises a plurality of bearing pads (in the case of the illustrated embodiment, four) each respectively generally indicated at 20 which underlie the lower surface of trunnion 12 in supporting relation to the trunnion. Bearing pads 20 are spaced from each other a short distance circumferentially of trunnion 12. A minimum of two pivoted bearing pads 20 is required to support the rotating journal or trunnion 12. Each bearing pad 20 comprises a pad portion 22 which extends circumferentially and axially of the trunnion 12 in underlying supporting relation to the trunnion. Each bearing pad 20 also includes a pivot support portion 24 which is suitably secured to the radially outer portion of each respective pad portion 22 or which may be integral with the bearing pad portion 22. Pivot support portion 24 is permanently located substantially midway between the opposite edges 30, 32 of pivoted bearing pad 20. The radially outer surface 26 of each pivot portion 24 is of spherical contour or of other suitable convex contour which permits the respective bearing pads 20 to undergo small rotations about at least two axes and preferably about all three axes indicated at $r$ (radial), $\theta$ (circumferential) and $z$ (axial) in FIGS. 1 and 2, as dictated by the oil film formed between the radially inner surface 28 of pad portion 22 and the radially outer cooperating surface 15 of the trunnion. The radially outer spherical or convex surface 26 of the pivot support 24 of each respective bearing pad 20 is adapted to bear against one of the inserts 21 in arcuate surface 19 of bearing support 18.

The outer periphery of the journal or trunnion 12 is provided with an axially extending and circumferentially extending countersunk surface 15 which is adapted to radially overlie the bearing surface 28 of pad 20, and the countersunk surface 15 on the rotating journal 12 is bounded at the opposite axial ends thereof by thrust shoulders on journal 12, respectively indicated at 17A and 17B, which engage thrust shoulders 23A, 23B on bearing pads 22.

The oil pressure developed in the lubricating oil film at the interface between the radially inner bearing surface 28 of each respective bearing pad portion 22 and the radially outer surface 15 of trunnion 12 supports the load L and during normal running operation of the rotary grinding mill is due to hydrodynamic action of the lubricating fluid (due to relative rotation between surfaces 28 and 15), the low pressure oil for hydrodynamic lubrication being supplied at oil distribution grooves 34 and 36 as will be described in more detail hereinafter. Alternatively, the oil film pressure between the bearing and journal may be due to hydrostatic operation of lubricant supplied by a relatively high pressure external pump, only at certain times during the operation of the grinding mill, particularly during the start-up, inching and shut-down operation of the grinding mill. High pressure oil for hydrostatic operation may be supplied through centrally located discharge opening 31 (FIG. 5) in bearing face 28 of the bearing pad 20. Discharge opening 31 is connected by suitable internal passages 33 in pad 20 to a source of high pressure oil.

This patent application is concerned with an improved apparatus and method related to the hydrodynamic lubrication system for the rotating journal, in which the lubricating oil is supplied to the system by a relatively low pressure pump, and in which the oil pressure is developed between the pivoted pad bearing surface 28 and the journal surface 15 by the hydrodynamic lubricating action provided by the rotation of the journal relative to the pivoted pad bearings.

The respective edges 30 and 32 are herein designated as the leading and trailing edges, respectively, of the pivoted bearing pad 20 relative to the counterclockwise direction of rotation shown in FIGS. 1 and 4. The term "leading edge" is defined as that edge of the pivoted bearing pad 20 which is first passed by a given point P on the periphery of the rotating journal for a given direction of rotation of the journal; while the term "trailing edge" is hereby defined as that edge of the pivoted bearing pad which is last reached by the given point P on the periphery of the rotating journal for the same direction of rotation of the journal. Thus, it will be seen in accordance with this definition that the point P on the periphery of trunnion 12 first reaches the edge 30 of the pivoted bearing pad 20 in the counterclockwise direction of rotation as viewed in FIGS. 1 and 4 and hence, the term leading edge is applied to edge 30; while the edge 32 is last reached by the point P on the trunnion in the counterclockwise direction as viewed in FIGS. 1 and 4, and hence, the term trailing edge is applied to the edge 32 of the pivoted bearing pad 20 relative to the counterclockwise rotation of journal 12 in FIGS. 1 and 4.

If the direction of rotation of journal 12 is reversed, the relative location of the leading edge and trailing edge on the pivoted bearing pad 20 is reversed. Thus, in the view of FIG. 5 in which journal 12 is assumed to be rotating in a clockwise direction, edge 32 of pivoted bearing pad 20 is the leading edge, while edge 30 is the trailing edge.

An oil distribution groove 34 is positioned in the radially inner face 28 of bearing pad 20 contiguous but spaced a definite distance counterclockwise of edge 30 relative to the views of FIGS. 1, 4 and 5. Similarly, an oil distribution groove 36 is positioned in the radially inner face 28 of bearing pad 20 contiguous but spaced a definite distance clockwise of edge 32 relative to the views of FIGS. 1, 4 and 5.

Figure 3:
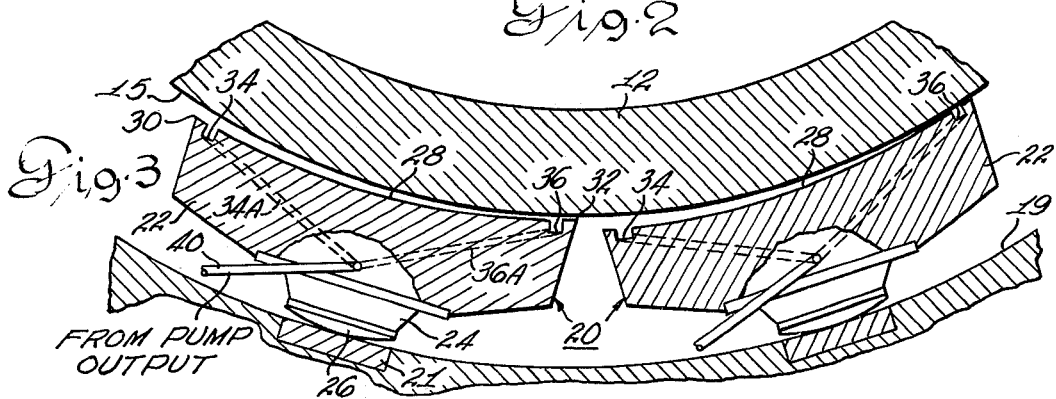
FIG. 3 is an enlarged fragmentary view showing two of the pivoted bearing pads of FIG. 1.

As seen in the embodiment shown in FIGS. 1 and 3 of the drawings, each bearing pad 20 is provided with a pair of internal passages 34A and 36A which respectively communicate with oil distribution grooves 34 and 36. The internal oil passages 34A and 36A are each connected to the discharge line 40 from a low pressure oil pump. The two internal oil passages 34A and 36A which respectively communicate with the oil distribution grooves 34 and 36 provide paths of equal frictional loss from oil pump line 40 to the respective feeder grooves or distribution grooves 34 and 36.

Refer now to FIGS. 4 and 5 which show schematic diagrams of the pivoted bearing pads 20 for counterclockwise and for clockwise rotation respectively. The oil piping system shown in the schematic diagrams of FIGS. 4 and 5 is slightly different than that shown in FIGS. 1 and 3, but is hydraulically equivalent to the arrangement of FIGS. 1 and 3. It will be seen that oil distribution groove 34 is connected by means of an internal passage 34A' in the body of the pivoted bearing pad (see FIG. 7) to a conduit or line 44 in series with a one-way flow check valve 46A to the discharge line 40' of a pump P of the single discharge outlet type. Similarly, the oil distribution groove 36 near the opposite edge of the pivoted bearing pad is also connected through an internal passage 36A' and conduit 48 through a one-way flow check valve 46B to the discharge line 40' of the pump P. It can be seen that the conduits or lines 44 and 48 and the corresponding internal passages 34A' and 36A' which supply the lubricating oil output of pump P to the oil distribution grooves 34 and 36 provide substantially equal flow resistance paths to grooves 34 and 36.

Assume that the journal or trunnion 12 is rotating in a counterclockwise direction as viewed in FIG. 4. In this case the edge 30 of the pivoted bearing pad 20 is the leading edge and the edge 32 of the pivoted bearing pad 20 is the trailing edge. During the counterclockwise rotation of the journal 12 as viewed in FIG. 12, as the oil wedge W develops due to hydrodynamic action provided by the relative rotation between journal 12 and pivoted bearing pad 20, the pivoted bearing pad 20 will automatically tilt counterclockwise about its pivotal support 24 (relative to FIG. 4) to provide a larger clearance space between the rotating journal 12 and the bearing surface 28 of bearing pad 20 contiguous leading edge 30 for counterclockwise rotation, than between the same surfaces contiguous the trailing edge 32. This larger clearance space between the rotating journal and the pivoted bearing pad in the region of the leading edge 30 (for counterclockwise rotation) may be referred to as the "incoming oil channel".

Due to the wider opening or greater clearance between bearing pad 20 and journal 12 contiguous the leading edge 30 and hence also contiguous leading oil distribution groove 34 relative to counterclockwise rotation, the frictional loss at the incoming oil channel (i.e. near edge 30) is less. Hence, due to the lower frictional resistance near leading edge 30 most of the oil flow will be through the oil distribution groove 34 and a much smaller flow of oil will be through the oil distribution groove 36 contiguous trailing edge 32 (relative to the counterclockwise rotation of FIG. 4). Thus, while the two oil grooves 34 and 36 are connected in parallel flow paths with each other relative to the output of the oil pump P the change in relative frictional resistance which develops during the rotation will cause a much greater proportion of the oil to flow through oil distribution groove 34 contiguous the leading edge 30 than will flow through oil distribution groove 36 contiguous trailing edge 32. Thus, the proper proportioning of the oil at two grooves 34 and 36 to facilitate optimum formation of the oil wedge W is provided automatically without the necessity of elaborate valving to control the proportioning of the oil flow at the respective oil distribution grooves 34 and 36.

Referring now to FIG. 5, the opposite situation prevails as compared to that just described in connection with FIG. 4. That is, since the trunnion or journal 12 is rotating in a clockwise direction relative to the view of FIG. 5, the pivoted bearing pad 20 will tilt in a clockwise direction (relative to FIG. 5) about its pivotal support 24 as oil wedge W develops contiguous the now leading edge 32 to thereby provide a greater clearance between surface 28 of bearing pad 20 and journal 12 in the incoming oil channel contiguous the now leading edge 32 than contiguous the now trailing edge 30. This reduces the frictional loss in the incoming oil channel contiguous edge 32 with the result that most of the oil coming from the output line 40' of pump P will flow through the now leading oil distribution groove 36 and a relatively much smaller flow of oil will pass through the now trailing oil distribution groove 34 relative to the clockwise direction of rotation of FIG. 5. Thus, the oil flow through the respective leading and trailing oil distribution grooves 36 and 34 relative to the clockwise rotation of FIG. 5 will automatically apportion itself for optimum operation without the necessity for elaborate valving.

It will be noted that in the embodiment schematically shown in FIGS. 4 and 5 one-way check valves 46A and 46B are connected in the respective branch lines 44 and 48, leading to the respective oil distribution grooves 34 and 36. Check valves 46A and 46B permit oil flow from the pump P to grooves 34 and 36 but prevent reverse flow from the grooves back to the pump, as well as preventing "feed back" of oil from one groove 34 or 36 to the other.

Suitable means (not shown) is provided for draining the lubricating oil after it has performed its lubricating function back to the sump S, where it is again drawn into pump P through the pump suction line 42 for recirculation to the pivoted bearing pads.

Preferably, in the embodiment illustrated in FIGS. 1 and 3 and also in the embodiment illustrated in FIGS. 4-7, inclusive, a separate pump P is provided for each bearing pad 20. That is, the pump and piping circuit hereinbefore described in the respective embodiments would be duplicated for each bearing pad 20.

However, it is also possible to use a single pump of the single discharge outlet type and of sufficient capacity and to connect all of the oil distribution grooves 34 and 36 of the plurality of pivoted bearing pads in parallel with each other across the single discharge outlet of the one pump.

Still a further arrangement which can be used is to provide a pump having multiple discharge outlets and to connect the two oil distribution grooves 34–36 of a given pivoted bearing pad in parallel with each other to one of the discharge outlets of such a pump, and with the pair of oil distribution grooves of each other pivoted bearing pad being connected to a corresponding different one of the multiple discharge outlets of the pump. Pumps having multiple discharge outlets are commercially available and are made, for example, by Dynex Company, 7770 Capitol Drive, Pewaukee, Wis. 53072.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination, a rotatable journal, a pivoted bearing pad in supporting relation to said journal for bidirectional rotation, of said journal, stationary structure supporting said pivoted bearing pad for pivotal movement, said pivoted bearing pad including a journal bearing surface extending in a generally circumferential and also in a generally axial direction of said journal whereby to support said journal for bidirectional rotation, said journal bearing surface including opposite circumferentially spaced first and second edges, said first and second edges being respectively the leading and the trailing edges for one direction of rotation of said journal, said first and second edges being respectively the trailing and the leading edges for the opposite direction of rotation of said journal, said leading edge being at the circumferential end of said pivoted bearing pad first reached by a given point on the periphery of said journal for any given direction of rotation of said journal, said trailing edge being at the circumferential end of said pivoted bearing pad last reached by said given point for any given direction of rotation of said journal, said bearing pad including a pivotal support located substantially midway between said first and said second edges, a first and a second lubricant discharge means in the journal bearing surface of said pivoted bearing pad respectively contiguous but spaced from said first and said second edges, means effective on both directions of rotation of said journal for simultaneously connecting a supply of lubricant through substantially equal resistance flow paths to both said first and said second lubricant discharge means, the normal tilting movement of said pivoted bearing pad due to lubricant film development providing a larger clearance space between said bearing pad and the rotating journal contiguous the leading edge of said bearing pad for any given direction of rotation of said journal than contiguous the trailing edge for said given direction of rotation, whereby to provide a power frictional loss lubricant flow channel contiguous said leading edge for said given direction of rotation than contiguous the trailing edge for said given direction of rotation, and thus to promote substantially greater flow of lubricant through the lubricant discharge means contiguous said leading edge for said given direction of rotation than through the lubricant discharge means contiguous said trailing edge for said given direction of rotation.

2. The combination defined in claim 1 including a pump means for supplying a pressurized supply of lubricant to said first and said second lubricant discharge means.

3. The combination defined in claim 1 in which each said lubricant discharge means comprises a lubricant distribution groove extending for a substantial portion of the axial length of said pivoted bearing pad.

4. The combination defined in claim 1 including check valve means in each fluid flow path between the supply of lubricant and the respective first and second lubricant discharge means, each check valve means preventing reverse flow in the respective fluid flow path in a direction away from its corresponding lubricant discharge means, and also preventing feed back from one fluid flow path to the other fluid flow path.

5. The combination defined in claim 1 including a plurality of similar pivoted bearing pads, and a separate pump means for each pivoted bearing pad.

6. The combination defined in claim 1 including a plurality of similar pivoted bearing pads, and a pump means common to said plurality of pivoted bearing pads.

7. A pivoted bearing pad adapted to be in supporting relation to a journal for bidirectional rotation of said journal, said pivoted bearing pad being adapted to be supported for pivotal movement by stationary structure, said pivoted bearing pad including a journal bearing surface extending in a generally circumferential and also in a generally axial direction of said journal whereby to support said journal for bidirectional rotation, said journal bearing surface including opposite circumferentially spaced first and second edges, said first and second edges being respectively the leading and the trailing edges for one direction of rotation of said journal, said first and second edges being respectively the trailing and the leading edges for the opposite direction of rotation of said journal, said leading edge being at the circumferential end of said pivoted bearing pad first reached by a given point on the periphery of said journal for any given direction of rotation of said journal, said trailing edge being at the circumferential end of said pivoted bearing pad last reached by said given point for any given direction of rotation of said journal, said bearing pad including a pivotal support located substantially midway between said first and said second edges, a first and a second lubricant discharge means in the journal bearing surface of said pivoted bearing pad respectively contiguous but spaced from said first and said second edges, said first and said second lubricant discharge means being adapted to simultaneously both be connected on either direction of rotation of said journal to a supply of lubricant through substantially equal resistance flow paths, the normal tilting movement of said pivoted bearing pad due to lubricant film development providing a larger clearance space between said pivoted bearing pad and the rotating journal contiguous the leading edge of said pivoted bearing pad for any given direction of rotation of said journal than contiguous the trailing edge for said given direction of rotation, whereby to provide a lower frictional loss lubricant flow channel contiguous said leading edge for said given direction of rotation than contiguous the trailing edge for said given direction of rotation, and thus to promote substantially greater flow of lubricant through the lubricant discharge means contiguous said leading edge for said given direction of rotation than through the lubricant discharge means contiguous said trailing edge for said given direction of rotation.

8. A pivoted bearing pad as defined in claim 7 in which each said lubricant discharge means comprises a lubricant distribution groove extending for a substantial portion of the axial length of said pivoted bearing pad.

9. The method of providing lubrication for a pivoted bearing pad which is in supporting relation to a journal for bidirectional rotation of said journal and in which said pivoted bearing pad comprises opposite circumferentially spaced first and second edges and a pivotal support located substantially midway between said first and second edges, said first and second edges being respectively the leading and the trailing edges for one direction of rotation of said journal, said first and said second edges being respectively the trailing and the leading edges for the opposite direction of rotation of said journal, said leading edge being at the circumferential end of said pivoted bearing pad first reached by a given point on the periphery of said journal for any given direction of rotation of said journal, said trailing edge being at the circumferential end of said pivoted bearing pad last reached by said given point for any given direction of rotation of said journal, and in which said pivoted bearing pad comprises a first and a second lubricant discharge means in the journal bearing surface of said pivoted bearing pad, said first and second lubricant discharge means being respectively located contiguous but spaced from said first and said second edges, said method comprising the steps of:

1. connecting a pressurized supply of lubricant through substantially equal flow resistance paths simultaneously to both said first and said second lubricant discharge means;

2. permitting the normal tilting movement of said pivoted bearing pad due to lubricant film development during rotation of said journal to provide a larger clearance space between said pivoted bearing pad and the rotating journal contiguous the leading edge of said pivoted bearing pad for any given direction of rotation of said journal than contiguous the trailing edge for said given direction of rotation, whereby to provide a lower frictional loss lubricant flow channel contiguous said leading edge for said given direction of rotation than contiguous the trailing edge for said given direction of rotation, and thus to promote substantially greater flow of lubricant through the lubricant discharge mean contiguous said leading edge for said given direction of rotation than through the lubricant discharge means contiguous said trailing edge for said given direction of rotation.

10. The method defined in claim 9 in which said pressurized supply of lubricant to said first and second lubricant discharge means is obtained from the same discharge outlet of a lubricant pump, said substantially equal flow resistance paths being connected in parallel flow relation with each other to said same discharge outlet.

* * * * *

PO-1050
(5/69)

UNITED STATES PATENT OFFICE
CERTIFICATE OF CORRECTION

Patent No. 3,891,281          Dated June 24, 1975

Inventor(s) Raymond C. Jenness

It is certified that error appears in the above-identified patent and that said Letters Patent are hereby corrected as shown below:

Column 7, line 19, "power" should read --- lower --- .

Signed and Sealed this

*twenty-seventh* Day of *April 1976*

[SEAL]

Attest:

RUTH C. MASON  
*Attesting Officer*

C. MARSHALL DANN  
*Commissioner of Patents and Trademarks*